United States Patent [19]
Serlin
[11] 4,167,602
[45] Sep. 11, 1979

[54] ELECTROGRAPHIC RECORDING MATERIAL

[75] Inventor: Irving Serlin, Springfield, Mass.
[73] Assignee: Monsanto Company, St. Louis, Mo.

[21] Appl. No.: 909,873
[22] Filed: May 26, 1978
[51] Int. Cl.[2] ........................ B32B 5/16; C08L 25/06; B32B 27/10
[52] U.S. Cl. .................................. 428/240; 96/1.5 N; 427/121; 427/180; 428/241; 428/242; 428/262; 428/323; 428/325; 428/331; 428/328; 428/513; 428/514; 428/461; 428/463
[58] Field of Search ............... 428/513, 514, 240, 241, 428/242, 262, 411, 331, 325, 323, 328, 461, 463, 513, 514; 260/874, 901; 427/121, 180; 346/135; 96/1.5

[56] References Cited

U.S. PATENT DOCUMENTS

| | | | |
|---|---|---|---|
| 2,377,231 | 5/1945 | Hayes | 260/874 |
| 3,307,963 | 3/1967 | Webber | 428/331 |
| 3,459,593 | 8/1969 | Cole | 428/513 |
| 3,840,399 | 10/1974 | Kobayashi | 428/522 |
| 3,946,129 | 3/1976 | Jones | 428/514 |
| 3,946,140 | 3/1976 | Noe | 428/522 |
| 3,956,562 | 5/1976 | Shibata | 428/512 |
| 3,956,571 | 5/1976 | Takao | 428/513 |
| 3,991,253 | 11/1976 | Markhart | 428/514 |

*Primary Examiner*—Ellis P. Robinson
*Attorney, Agent, or Firm*—R. Bruce Blance; William J. Farrington; James C. Logomasini

[57] ABSTRACT

An electrographic recording material comprising a conductive sheet support coated with an electrically insulating layer comprising an intimate blend of a polymeric binder and up to 500 parts of an inert finely divided pigment per 100 parts by weight of polymeric binder. The binder comprises from about 50 to about 90 parts by weight of a styrene interpolymer or a vinyl acetate polymer and a low molecular weight polystyrene or poly($\alpha$-methylstyrene) of relative viscosity determined at 25° C. in ethyl acetate at a concentration of 2 grams per 100 ml of solution in the range of about 1.04 to about 1.15. The electrographic recording material exhibits improved toner adhesion and reduced toner smear.

11 Claims, No Drawings

ELECTROGRAPHIC RECORDING MATERIAL

This invention relates to an electrographic recording material adapted for use in electrographic printing processes and to a method of making and using such an electrographic recording material.

In general, electrographic recording processes involve forming a latent image upon an electrically insulating charge-retentive layer of an electrographic recording material by impressing an electric charge corresponding to an original pattern and treating or developing the latent image by applying to the charge-retentive layer a colored resinous powder or toner which clings to the charged areas but which does not adhere to the uncharged areas. The developed image is then fixed by application of heat and/or pressure to the electrographic recording material to fuse the toner particles to the charge retentive layer and form a permanent visible image. The electrographic recording material comprises an electroconductive sheet support coated with the electrically insulating charge-retentive layer comprising an electrically insulating polymeric binder and optionally a pigment or filler. Styrene interpolymers and vinyl acetate polymers have been found to be suitable as the electrically insulating polymeric binder. However, recording materials comprising such interpolymers are subject to certain problems such as toner smear especially under high humidity conditions, which manifests itself in offsetting, finger printing and generally smudgy copies, and particularly when the insulating layer contains high concentrations of pigment, low toner retention when the developed recording material is subjected to an adhesion test.

SUMMARY OF THE INVENTION

According to the present invention, there is provided an electrographic recording material comprising a conductive sheet support coated on at least one side with an electrically insulating layer comprising an intimate blend of a polymeric binder and up to 500 parts by weight of a finely divided pigment per 100 parts by weight of polymeric binder, wherein the polymeric binder comprises from about 50 to about 90 parts by weight of a styrene interpolymer or a vinyl acetate polymer and from about 10 to about 50 parts by weight of a low molecular weight polystyrene or poly($\alpha$-methylstyrene) of relative viscosity determined at 25° C. in ethyl acetate at a concentration of 2 grams per 100 ml of solution in the range of about 1.04 to about 1.15.

The recording material exhibits improved resistance to toner smear and improved toner retention when the developed recording material is subjected to an adhesion test.

Other aspects of the invention are directed to a method of producing the electrographic recording material, to an electrographic recording method employing the electrographic recording material and to the coating composition comprising polymeric binder and pigment used for preparation of the electrically insulating layer of the electrographic recording medium.

DESCRIPTION OF THE PREFERRED EMBODIMENTS

Suitable polymers for the electrically insulating layer include homopolymers and interpolymers of vinyl acetate and interpolymers of styrene wherein the glass transition temperature determined on a duPont Differential Thermal Analyzer Model No. 900 at a heating rate of 20° C. per minute is preferably in the range of about 10° to about 50° C. The interpolymers can include units derived from any unsaturated monomer capable of interpolymerization with vinyl acetate or styrene. Preferred interpolymers include up to about 10 weight percent of units derived from an unsaturated carboxylic monomer such as acrylic acid, methacrylic acid, crotonic acid, isocrotonic acid, itaconic acid, maleic acid, fumaric acid, citraconic acid and mesaconic acid and the monalkyl esters of such dicarboxylic acids wherein the alkyl group contains from 1 to 4 carbon atoms.

Among the preferred vinyl acetate interpolymers are those comprising from about 60 to about 90 parts by weight vinyl acetate, from about 9 to about 30 parts by weight of a monomer selected from the group consisting of alkyl acrylates containing from 4 to 7 carbon atoms, dialkyl maleates and fumarates containing from 6 to 12 carbon atoms, and vinyl esters of monocarboxylic acids containing from 5 to 20 carbon atoms, and from about 1 to 10 parts by weight of an unsaturated carboxylic acid monomer selected from the group consisting of acrylic acid, methacrylic acid, crotonic acid and monoalkyl maleates and fumarates containing from 5 to 8 carbon atoms. Particularly preferred interpolymers comprise from about 60 to about 90 parts by weight of vinyl acetate, from about 0 to about 30 parts by weight of a dialkyl maleate containing from 6 to 12 carbon atoms and from about 1 to about 10 parts by weight of acrylic acid.

Among the preferred styrene interpolymers are those comprising from about 30 to about 75 parts by weight of styrene, from about 69 to about 15 parts by weight of a monomer selected from the group consisting of alkyl acrylates and methacrylates containing from 4 to 15 carbon atoms and dialkyl maleates and fumarates containing from 6 to 28 carbon atoms and from about 1 to about 10 parts by weight of an unsaturated carboxylic acid monomer selected from the group consisting of acrylic acid, methacrylic acid, crotonic acid and monoalkyl maleates and fumarates containing from 5 to 8 carbon atoms. Particularly preferred interpolymers comprise about 30 to about 70 parts by weight of styrene, from about 69 to about 20 parts by weight of an alkyl acrylate containing from 5 to 11 carbon atoms and from about 1 to about 10 parts by weight of acrylic acid. The internal plasticizing groups in these interpolymers reduce the curling tendency of the recording msterial under conditions of varying humidity.

The monomeric components can be converted into the interpolymers by conventional addition polymerization reactions. Solvent, dispersion, and emulsion polymerization techniques can be used with the aid of the usual addition polymerization initiators. The molecular weight of the interpolymers is generally such that the relative viscosity determined with a solution containing 2 g interpolymer per 100 ml solvent is in the range of about 1.3 to about 6.0.

The electrically insulating binder of the recording material of the present invention comprises a blend of a styrene interpolymer or a vinyl acetate polymer as described heretofore, with a low molecular weight homopolymer of styrene or $\alpha$-methylstyrene or a copolymer of styrene and $\alpha$-methylstyrene, the relative viscosity of which, determined at 25° C. in ethyl acetate at a concentration of 2 g per 100 ml solution is in the range of about 1.04 to about 1.15. The blend ratio of styrene interpolymer or vinyl acetate polymer and styrene polymer is generally selected to provide improved toner smear resistance and is preferably selected in the range of about 60 to about 90 parts by weight of styrene interpolymer or vinyl acetate polymer to about 10 to about 40 parts by weight of styrene polymer. In comparison with a vinyl acetate interpolymer, a polyblend of the interpolymer and a styrene polymer of relative viscosity less than about 1.04 gives an insulating layer with increased toner smear resistance but the toner lacks adhesion to the insulating layer and can be readily picked off from the developed image as can be demonstrated by the tape-adhesion test. In the tape test, a strip of pressure sensitive adhesive tape sold under the tradename Scotch Magic Tape by the 3 M Company is applied to the developed image by means of a 5-pound (2.27 kg), 4-inch diameter (10.16 cm) rubber roller at room temperature (25° C.) and 50 percent relative humidity, and is then peeled at a 90° angle at a rate of about 10 inches (25.4 cm) per minute. The ease of picking is determined from the percentage retention of image density after the tape has been peeled. Similarly, a polyblend containing a styrene polymer of relative viscosity greater than about 1.15 can impart increased toner smear resistance but the percentage retention of image density in the tape test is rather low, and a further disadvantage is observed in that the pigmented coating solution separates into two phases.

The polymer blend is applied to a support in the form of a continuous film from organic solvent solution by means generally known in the art, such as by spray, brush, roller, wire-rod, doctor blade, air-brush, and wiping techniques. Appropriate organic solvents for the blend include solvents such as the lower alcohols, ketones, esters and aromatic hydrocarbons and mixtures of such solvents with the lower aliphatic and alicyclic hydrocarbons. As is generally known the use of high boiling solvents may prevent adequate drying in the drying oven.

An inert non-photoconductive pigment may be added to the solution. A fine dispersion of the pigment can be obtained by conventional high shear mixing. Afterwards the viscosity can be adjusted e.g. by the addition of solvents. This depends, of course, on the nature of the coating system used. Suitable non-photoconductive pigments are organic as well as inorganic substances such as silica, calcined clay, zinc oxide, zinc sulfide, titanium dioxide, talcum, calcium carbonate, diatomaceous earth, barium sulfate and lithopone. The grain size of the pigments should not exceed about 20 microns and preferably should be less than about 10 microns. Preference is given to pigments having a particle size of at most about 1 micron.

The use of non-photoconductive pigments in an electrostatic recording paper according to the invention has many advantages. By the addition of pigments a more economical recording material can be obtained, a mat aspect can be given to the electrographic recording material and "tooth" or ability to be marked or written upon by pen or other marking means is improved. The range of the amounts of pigments is rather large. Depending on the nature of the copolymer used, the size of the pigment particles, and the intended use, 0.1 to 500 parts of pigment per 100 parts of insulating polymeric binder can be used. In order to obtain the advantages of the pigment, preferably from about 200 to about 400 parts of pigment per 100 parts by weight of polymer blend is used.

The amount or weight of insulating layer in the recording material should be sufficient to provide a uniform coating substantially free of defects which might impair the quality of the image reproduced on the insulating layer. The amount can be in the range of about 2 to about 20 g dry weight per sq. m. of recording material, preferably between 4 and 10 g. and even more preferably between 5 and 8 g/sq.m. However, smaller amounts may suffice if a sufficient electrostatic charge can be applied without the risk of breakdown. Thicker layers are less favorable because processing difficulties may arise during charging and development.

In general, paper is used as support for the insulating layer, although other supports such as metal foils or sheets, textile materials, and plastic films such as films of cellulose triacetate or of polyesters e.g. of polyethylene terephthalate can also be used. In comparison to the insulating layer, the support must have a much higher electric conductance as will be described more clearly hereinafter.

The electroconductivity of normal paper is rather low, especially when it has been coated with a covering layer e.g. of polyolefins such as polyethylene or polypropylene. Therefore, the electroconductivity of the paper should be enhanced to obtain an appropriate electrostatic recording material. This can be accomplished e.g. by the addition of salts such as potassium nitrate and/or conductive polymers to the wood pulp during the paper making. A favorable electroconductivity of the paper can also be obtained by impregnating the paper already formed with solutions of salts and/or conductive polymers. Good results are obtained also with paper carrying on at least one side a conductive layer serving as an intermediate layer between the support and the insulating layer. This conductive layer may be composed of e.g. conductive polymers.

Surface resistivity values in the range of about $1\times10^7$ to $1\times10^{10}$ ohm/sq. for the support allow a normal charging of the insulating surface. Indeed, it should be taken into account, that the surface resistance values of the insulating layer, when measured in the same way, are normally much higher and will show values of $1\times10^{11}$ to $1\times10^{14}$ ohm/sq. or even more.

What has been said above concerning the improvement of the conductivity of paper by the application thereto of conductive polymers also applies to other supports. By the application of conductive polymers to at least one side of these supports a satisfactory electroconductivity can also be obtained. Of course, it may sometimes by necessary, for example, when highly hydrophobic films are used as supports e.g. films of polyethylene terephthalate, to provide these film supports first with a known subbing layer or combination of layers to secure a sufficient adhesion of the layers coated thereon.

The electrographic recording material of the invention can be used in an electrostatic printing apparatus wherein an electrostatic charge pattern is built up on the insulating layer by conventional means such as by moving the material in close contact with electroconductive styli or by transferring an electrostatic charge pattern from a photoconductive drum.

The electrostatic latent charge pattern formed on the insulating layer can be developed according to techniques known in the art, e.g. by means of a two-component developer composed of a toner and a carrier material or by liquid electrophoretic development. The developed pattern is then made permanent or fixed by application of heat or pressure to fuse the toner to the insulating layer.

The invention is further described and illustrated in the following examples which should not be construed as limiting its scope. All parts and percentages are by weight unless otherwise indicated.

EXAMPLE 1

A uniform blend of a calcined clay sold by Engelhard Minerals and Chemicals Division under the tradename Ansilex, a vinyl acetate interpolymer comprising 70.5 weight percent vinyl acetate, 25 weight percent dibutyl maleate and 4.5 weight percent acrylic acid, and toluene is prepared by mixing the ingredients with a high speed blender. The weight ratio of calcined clay, to vinyl acetate interpolymer to toluene is 54.6:5.4:40. The blend is further mixed with an additional quantity of the vinyl acetate interpolymer, a polystyrene resin sold by Hercules Powder Co. under the tradename of Piccolastic A-75, of inherent viscosity 1.052 determined at 25° C. in ethyl acetate at a concentration of 2 g per 100 ml and additional toluene to obtain a uniform dispersion containing 54.8 parts by weight of toluene, 32.1 parts calcined clay, 11.9 parts vinyl acetate interpolymer and 3.2 parts styrene polymer. The pigment to binder ratio is 2.5:1. The viscosity of the dispersion at 25° C. is 70 cps.

The dispersion is applied with a Meyer number 12 wire wound rod to the wire side of an electrically conductive paper stock sold by the James River Company under the trade designation J Stock to provide a dry coating weight of 8.0 g. per sq. meter of recording material. The coated paper is printed from a standard master at 50 percent relative humidity in a Minolta 101 Electrographic Copier. The printer paper is subjected to a smear test by rubbing it with a finger and is rated on a scale of 1 to 10 where 1 indicates that substantially no smear, finger printing or smudging occurred, 5 indicates that some smear but little finger printing occurred and 10 indicates that substantial smear and finger printing occurred.

The print density is determined by the Welch Scientific Company's Densichron Instrument using the black filter and standardized against the Reflection Standard No. 2 at a density of 0.505. The paper is subjected to the tape test at 25° C. and 50 percent relative humidity and the print density is again measured. The percent retention of density is calculated from the values before application of the tape and after its removal. In an average of two tests the smear resistance is rated 3, the print density is 1.25, and the density retention in the tape test is 54 percent.

In contrast, a recording medium prepared with the vinyl acetate interpolymer without the styrene polymer has a smear resistance rating of 9, a print density of 1.18 and a density retention in the tape test of 33 percent. On the other hand, a smooth dispersion containing only the polystyrene resin cannot be made, and when the dispersion is coated onto the electriconductive support, it gives an uneven, grainy coating unsatisfactory for electrographic purposes.

EXAMPLES 2-5

Polyblends are prepared by the procedure of Example 1 with the vinyl acetate interpolymer of Example 1 and a series of polystyrenes. Dispersions are prepared from the polyblends and Ansilex—calcined clay and the dispersions are used to prepare electrographic recording materials in the manner described in Example 1. The recording materials are evaluated by printing them in a Minolta 101 Electrographic Copier. Data for the prints are presented in Table 1 and show that when the relative viscosity of the polystyrene is about 1.038, (Example 2) the density retention is low although the smear resistance is improved and that when the relative viscosity is about 1.2 or greater (Examples 4 and 5), there is little improvement in density retention and a problem of phase separation of the dispersion occurs. In contrast, Examples 1 and 3 which are within the scope of the invention, show improvement in smear resistance and a pronounced improvement in density retention in the tape test.

Electrographic Recording Media Comprising Vinyl Acetate Interpolymer and Polystyrene

| | 1 | 2 | 3 | 4 | 5 | 6 |
|---|---|---|---|---|---|---|
| Polystyrene component, relative viscosity | 1.052 | 1.038 | 1.16 | 1.20 | 1.23 | * |
| Dispersion phase separation | none | none | slight | extreme | extreme | none |
| Coating weight $g/m^2$ | 8.0 | 8.9 | 7.5 | 7.8 | 7.3 | 8.5 |
| Finger smear Resistance | 3 | 3 | 6 | 6 | 4 | 9 |
| Minolta 101 Image Density, 50% RH | | | | | | |
| Before tape test | 1.25 | 1.12 | 1.20 | 1.18 | 1.07 | 1.18 |
| After tape test | 0.68 | 0.25 | 0.50 | 0.39 | 0.37 | 0.39 |
| % retention | 54 | 22 | 42 | 33 | 35 | 33 |

*recording medium containing vinyl acetate interpolymer without polystyrene.

EXAMPLE 7

An electrographic recording medium is prepared by the procedure of Example 1 with the vinyl acetate interpolymer of Example 1 and a poly(α-methylstyrene) of relative viscosity 1.052 at 25° C. determined with an ethyl acetate solution containing 2 g of poly(α-methylstyrene) per 100 ml. solution. The ratio of vinyl acetate interpolymer to poly(α-methylstyrene) is 10:3. The pigment is Ansilex calcined clay and the pigment to binder ratio is 3:1. The electrographic recording medium is printed in the Minolta 101 Electrographic Copier. The printed paper has a smear resistance rating of 5 compared with 9 for an equivalent system containing only the vinyl acetate interpolymer as the pigment binder.

EXAMPLES 8 and 9

An electrographic recording medium is prepared by the method of Example 1 with a styrene interpolymer comprising 47 parts by weight styrene, 50 parts by weight ethyl acrylate and 3 parts by weight acrylic acid and the polystyrene of Example 1. The weight ratio of styrene interpolymer to polystyrene is 77:23. The pigment is calcined clay of Example 1 and the pigment to binder ratio is 2:1 by weight. This example is designated Example 8. The Minolta 101 print density at 50 and 80% relative humidity respectively is 1.28 and 1.27. The smear resistance is 1, and the percent retention in the adhesive test is 64.

A similar example (Example 9) is prepared with a binder comprising only the styrene interpolymer of Example 8. On contrast to Example 8, Example 9 has a slightly better print density of 1.37 and 1.28 at 50 and 80% R.H., respectively but a significantly poor smear resistance rating of 9 and a percent retention of density of only 40.

EXAMPLES 10 and 11

Examples 8 and 9 are repeated with a styrene interpolymer comprising 74 parts by weight styrene, 25 parts by weight ethyl acrylate and 1 part by weight acrylic acid in place of the styrene interpolymer of Examples 8 and 9. The print densities at 50% relative humidity are respectively 1.29 and 1.28 and at 80% relative humidity 1.23 and 1.11. The toner smear resistance is 2 versus 9, and the percent density retention is 65 versus 35. Thus, the advantage of the blend containing low molecular weight polystyrene is again demonstrated by the improved toner smear resistance and density retention.

What is claimed is:

1. An electrographic recording material comprising a conductive sheet support coated on at least one side with an electrically insulating layer comprising an intimate blend of a polymeric binder and up to 500 parts by weight per 100 parts by weight of polymeric binder, of an inert, non-photoconductive pigment of particle size not greater than about 20 microns, wherein the polymeric binder comprises from about 50 to about 90 parts by weight of a styrene interpolymer or a vinyl acetate polymer and from about 10 to about 50 parts by weight of a low molecular weight polystyrene or poly(α-methylstyrene) of relative viscosity in the range of about 1.04 to about 1.15 determined at 25° C. in ethyl acetate at a concentration of 2 grams per 100 ml of solution, wherein the styrene interpolymer comprises from about 30 to about 75 parts by weight of styrene, from about 69 to about 15 parts by weight of a monomer selected from the group consisting of alkyl acrylates and methacrylates containing from 4 to 15 carbon atoms and dialkyl maleates and fumarates containing from 6 to 28 carbon atoms and from about 1 to about 10 parts by weight of an unsaturated carboxylic acid monomer selected from the group consisting of acrylic acid, methacrylic acid, crotonic acid, and monoalkyl maleates and fumarates containing from 5 to 8 carbon atoms and wherein the vinyl acetate polymer is selected from the group consisting of polyvinyl acetate and interpolymers of vinyl acetate comprising from about 60 to about 90 parts by weight of vinyl acetate, from about 9 to about 30 parts by weight of a monomer selected from the group consisting of alkyl acrylates containing from 4 to 7 carbon atoms, dialkyl maleates and fumarates containing from 6 to 12 carbon atoms, and vinyl esters of monocarboxylic acids containing from 5 to 20 carbon atoms, and from about 1 to 10 parts by weight of an unsaturated carboxylic acid monomer selected from the group consisting of acrylic acid, methacrylic acid, crotonic acid and monoalkyl maleates and fumarates containing from 5 to 8 carbon atoms.

2. An electrographic recording material comprising a conductive sheet support coated on at least one side with an electrically insulating layer comprising an intimate blend of a polymeric binder and up to 500 parts by weight per 100 parts by weight of polymeric binder of an inert, non-photoconductive pigment of particle size not greater than about 20 microns per 100 parts by weight of polymeric binder, wherein the polymeric binder comprises from about 50 to about 90 parts by weight of a vinyl acetate interpolymer and from about 10 to about 50 parts by weight of a low molecular weight polystyrene or poly(α-methylstyrene) of relative viscosity in the range of about 1.04 to about 1.15 determined at 25° C. in ethyl acetate at a concentration of 2 grams per 100 ml of solution, wherein the vinyl acetate interpolymer comprises from about 60 to about 90 parts by weight of vinyl acetate, from about 0 to about 30 parts by weight of a dialkyl maleate containing from 6 to 12 carbon atoms and from about 1 to about 10 parts by weight of acrylic acid.

3. An electrographic recording material comprising a conductive sheet support coated on at least one side with an electrically insulating layer comprising an intimate blend of a polymeric binder and up to 500 parts by weight per 100 parts by weight of polymeric binder of an inert, non-photoconductive pigment of particle size not greater than about 20 microns, wherein the polymeric binder comprises from about 50 to about 90 parts by weight of a styrene interpolymer and from about 10 to about 50 parts by weight of a low molecular weight polystyrene or poly(α-methylstyrene) of relative viscosity in the range of about 1.04 to about 1.15 determined at 25° C. in ethyl acetate at a concentration of 2 grams per 100 ml of solution, wherein the styrene interpolymer comprises from about 30 to 70 parts by weight of styrene, from about 69 to about 20 parts by weight of an alkyl acrylate containing from 5 to 11 carbon atoms and from about 1 to about 10 parts by weight of acrylic acid.

4. The recording material of claim 1, 2 or 3 wherein the coating weight of the insulating layer is in the range of about 4 to about 10 grams per square meter of recording material.

5. The recording material of claim 1, 2 or 3 wherein the finely divided pigment is selected from the group consisting of silica, calcined clay, zinc oxide, zinc sulfide, titanium dioxide, talcum, barium sulfate, calcium carbonate, lithopone and diatomaceous earth.

6. The recording material of claim 1, 2 or 3 wherein the conductive sheet support is selected from the group consisting of a metal foil, an electrically conductive paper, an electrically conductive textile material and an electrically conductive polymeric film.

7. The recording material of claim 1, 2 or 3 wherein the conductive sheet support is an electrically conductive paper having a conductive resin coating on at least one side thereof.

8. The recording material of claim 1, 2 or 3 wherein the coating weight of the insulating layer is in the range of about 2 to about 20 grams per square meter of recording material.

9. The recording material of claim 1, 2 or 3 wherein the insulating layer comprises from 200 to 400 parts by weight of pigment per 100 parts by weight of polymeric binder.

10. A method of producing an electrographic recording material which comprises applying to a conductive sheet support a dispersion of an inert, non-photoconductive pigment of particle size not greater than about 20 microns in an organic solvent solution of an insulating polymeric binder and evaporating the solvent to form a continuous insulating layer in adherent contact with the conductive sheet support, wherein the insulating polymeric binder comprises from about 50 to about 90 parts by weight of a styrene interpolymer or a vinyl acetate polymer and from about 10 to about 50 parts by weight of a low molecular weight polystyrene or poly(α-methylstyrene) of relative viscosity in the range of about 1.04 to about 1.15 determined at 25° C. in ethyl acetate at a concentration of 2 grams per 100 ml of solution.

11. A method of electrographic recording comprising forming an electrostatic charge pattern on an electrically insulating layer of an electrographic recording medium, developing the charge pattern by application of a toner and fixing the toner by heat or pressure, wherein the electrically insulating layer comprises an intimate blend of a polymeric binder and up to 500 parts by weight per 100 parts by weight of polymeric binder of an inert non-photoconductive pigment of particle size not greater than about 20 microns, wherein the polymeric binder comprises from about 50 to about 90 parts by weight of a styrene interpolymer or a vinyl acetate polymer and from about 10 to about 50 parts by weight of a low molecular weight polystyrene or poly-(α-methylstyrene) of relative viscosity in the range of about 1.04 to about 1.15 determined at 25° C. in ethyl acetate at a concentration of 2 grams per 100 ml of solution.

* * * * *